(12) United States Patent
Zyka

(10) Patent No.: US 7,712,907 B2
(45) Date of Patent: May 11, 2010

(54) RING FLASH ADAPTER

(76) Inventor: Dalibor Zyka, Na Lukach 1a, 373 16 Dobra Voda u Ceskych, Budejovic (CZ)

(*) Notice: Subject to any disclaimer, the term of this patent is extended or adjusted under 35 U.S.C. 154(b) by 99 days.

(21) Appl. No.: 12/051,079

(22) Filed: Mar. 19, 2008

(65) Prior Publication Data
US 2009/0238527 A1 Sep. 24, 2009

(51) Int. Cl.
G03B 15/02 (2006.01)
G03B 15/06 (2006.01)
F21V 7/04 (2006.01)

(52) U.S. Cl. .................. 362/16; 362/551; 396/198; 396/199

(58) Field of Classification Search ........... 362/551, 362/16; 396/198, 199, 155, 267
See application file for complete search history.

(56) References Cited

U.S. PATENT DOCUMENTS

| | | | |
|---|---|---|---|
| 4,085,436 A * | 4/1978 | Weiss | 362/16 |
| 4,380,787 A * | 4/1983 | Stone | 362/16 |
| 5,345,284 A * | 9/1994 | Tsuruta | 396/190 |
| 6,874,921 B2 * | 4/2005 | Verlage et al. | 362/487 |
| 7,127,163 B2 * | 10/2006 | Lee et al. | 396/198 |
| 2006/0039692 A1 | 2/2006 | Lee et al. | |
| 2006/0209417 A1 | 9/2006 | Kojima | |
| 2007/0159846 A1* | 7/2007 | Nishiyama et al. | 362/602 |

FOREIGN PATENT DOCUMENTS

| | | |
|---|---|---|
| CZ | 221782 | 7/1981 |
| DE | 10146158 | 4/2003 |
| EP | 1099902 A1 | 5/2001 |
| EP | 1574897 | 9/2005 |
| JP | 2001-255574 A | 9/2001 |
| WO | 2007/006241 | 1/2007 |
| WO | 2007/134553 | 11/2007 |

OTHER PUBLICATIONS

International Search Report: PCT/CZ2008/000121.

* cited by examiner

*Primary Examiner*—Jong-Suk (James) Lee
*Assistant Examiner*—David R Crowe
(74) *Attorney, Agent, or Firm*—Ladas & Parry LLP (57) ABSTRACT

A ring flash adapter of the flash uses a clamping device attached to the external flash of the camera, and using the lightguide (1) the, light can be transmitted from the flash into circular body. The lightguide has a flat circle and a head with an incidence surface and a reflecting surface. The lightguide also has an even number of separate, parallel, inter-connected shaped belt segments inserted in the head. The foreside of the circle forms an emission surface; the rear side is provided with a system of "V" shaped teeth to reflect light on the emission surface.

4 Claims, 10 Drawing Sheets

RING FLASH ADAPTER

FIELD OF THE INVENTION

The present invention relates to a ring flash adapter distributing light emitted from a point source light or bounded source light attached to the camera into a circular shape around the lens of the camera providing a soft diffusion of the flashlight in the space in front of the camera.

PRIOR ART

Ring flash adapters have been known that achieve the so-called soft light illumination, i.e. an illumination without marked shadows. These extensions are made as separate adapters for the classical external flashes, attachable to the camera; they are used to transmit the point source light to the circular, the annular emitting surface, respectively.

According to the Czech author's certificate No. 221 782 "Reflecting ring to diffuse discharge from a classical flash into a circular area around the camera lens" (CUBAN, Petr) application date 22 Jul. 1981, PV 5566-81) a ring flash adapter has been known. It consists of an inner and outer cylinder jacket, front diffuser and a back wall where the inside of this ring flash adapter, except of the front diffuser, is provided with reflecting layers made from ballotini glass grains. The flash is attached to the ring adapter perimeter tangentially, the ring flash adapter itself is mounted on the camera lens concentrically. The light from the flash enters axially through an opening into the ring flash adapter and it falls on the ballotini glass grains forming the inner reflecting layer; this reflecting layer will start shining. The disadvantage of this invention is that its light emission efficiency is low.

A similar solution of a ring flash adapter for macrophotography but with a build-in flashlight is described in the German patent application DE 10146158 (BÖSHENZ, Ernst). A circular lightguide made from a light guiding material (acrylate) is arranged concentrically around the lens, it is fixed using a thread or a frame. The light of the in-build flash enters the extension through the incidence surface overlaying the discharge tube of the in-built flash and is reflected on the slanted reflecting surface inside the extension where due to the reflecting layers on the inner, outer and back wall it is emitted concentrically around the lens from the front wall of the circular extension. The described embodiment is aimed at cameras with the in-built flash but its emission efficiency is insufficient for common studio photography. The low efficiency is caused by the lateral slanted reflecting surface which insufficiently reflects light inside the annular space and by reflections on the reflecting surfaces.

From the patent application WO 2007/006241 (ZÝKA, Dalibor) another ring flash adapter for a camera with a flash is known. In this case there is a reflecting built-in prism inside the extension opposite the inlet opening, the shape of which is adapted to tightly mount a flashlight head. The reflecting prism divides the flashlight in two light beams which enter the annular space of the extension where they are further reflected by the reflecting surfaces and emitted by the front diffuser. The reflecting prism forms at least two reflecting surfaces forming a closed angle between each other. The apex of this angle is situated in the projection of the central axis of the ring flash adapter at the inlet opening and the angle legs open toward the front diffuser so that each reflecting surface is slanted against the extension interior on both sides of the inlet opening. The ends of the lightguiding circle can be arranged opposite the reflecting surfaces. The lightguiding circle transmits the light on the perimeter of the circular extension.

The disadvantage consists in the fact that the reflected light still does not penetrate all parts of the ring flash adapter evenly. The greatest amount of light is emitted by the ring flash adapter close to the inlet opening, the smallest amount, on the other hand, is emitted from the part of the ring flash adapter opposite to the inlet opening. This irregularity is disadvantageous as the light diffusion is not perfectly regular and undesirable shadows arise while taking photographs.

The patent application WO 2007/134553 "Optical fibre for light distribution from a point-source of light or from a bounded light source to the circular transparent diffuser" (ZÝKA, Dalibor) discloses another lightguide for the distribution of light into a ring adapter of a flash. This lightguide is formed by a lightguiding head with a flat incidence surface and a flat reflecting surface, which is slanted against the incidence surface under a 45° angle. Two quadrilateral arms are tied up to the reflecting surface in the form of a reversed letter "V" distributing the light into both semicircles of the ring flash adapter on the ends of the quadrilateral arms.

The disadvantage of the invention consists in the fact that the light is reflected evenly into both semicircles but a great amount of the reflected light is absorbed in the ring flash adapter.

From a published European patent application EP 1 574 897 "Ring illumination apparatus and photographing apparatus having the same (CANON KABUSHIKI KAISHA) an illumination apparatus is known disclosing a circular extension of additional illumination of the video camera. The circular extension which forms a circle made of lightguiding material with prism-like portions is attached concentrically to the lens of the video camera or camera. It receives the light emitted by the point source on the incidence surface and transmits it to the reflecting surface wherefrom the light is emitted as a circular illumination.

The subject matter of the described ring apparatus consists in the fact that it has an optical ring with one reflecting rear surface to change the direction of the light on which the concentrated light beam falls that has been driven tangentially into the ring apparatus. The reflecting surface is formed from a plurality of adjacent elements of prismatic shape. These divide the emitted beams into two components, one of which with a determined wave length is reflected on the emission surface and the odd light leaves the optical member and falls on another adjacent prism-like portion where the whole process is repeated. In this manner the light is transmitted from the whole circular emission surface.

The described apparatus is convenient for diffusing light into the circular emission surface for lower output devices but its disadvantage consists in the fact that it is not convenient for transmission of the light output of strong external flashes nor is it adapted to be mounted thereon. It is rather convenient for video cameras, since they do not have flashes but rather auxiliary sources from LED to illuminate dark scenes or short distances. To be adjusted for a flash its proportions and weight would be so exceeding that it would be difficult to attach it to the flashlight of a camera.

SUBJECT MATTER OF THE INVENTION

The above discussed disadvantages are removed to a certain degree by a ring flash adapter including a clamping device to attach to the external flash of the camera; a circular body with a transparent and lightproof part connected to the clamping device; a lightguide extended to the circular body and to the clamping device; the said lightguide has a head consisting of an incidence surface which the flashlight impinges on, a reflecting surface slanted to the incidence surface and reflecting the light further into the lightguide and at least one emission surface which emits the light from the lightguide.

The lightguide has the shape of a flat circle set in a circular body; the circle is made of an even number of separate, parallel, inter-connected shaped belt segments which in the place of their contact on the perimeter of the circle are conducted radially and jointly out from the circle into the head.

The foresides of the segments are flat and their system forms the emission surface of the circle; the rear sides of the segments are provided with "V" shaped teeth, and they form a system of teeth on the rear side of the circle; the upper parts of the segments are evenly shaped and they form a head with an incidence and a reflecting surface.

The flashlight enters the head of the lightguide through the incidence surface; on the reflecting surface it is reflected into the individual segments and in them it impinges on their foresides under an angle. From here it is reflected on the rear sides, on the system of "V" shaped teeth which reflect the beams perpendicularly to the foresides from where they are emitted outside. The advantage of the invention consists in the fact that the light reflected from the reflecting surface is conducted through the individual segments into the two semi-circles evenly; it is conducted evenly on the whole perimeter of the circle and it is diffused evenly from the whole emission surface, even though the weight of the whole device is rather low and its dimensions are small and it is capable of transmitting high light and warmth output.

In an advantageous embodiment of the invention the individual segments are inter-connected in the head, e.g. by sticking or by sonic welding, which is sufficient to ensure satisfactory strength and toughness of the lightguide.

From the production point of view it is advantageous that the length of each segment corresponds to the length of the head and the half of the perimeter of the circle in the layer appropriate to the given segment; the lower ends of the respective segments are inter-connected in one layer. It is difficult to manufacture, shape and fold together a shaped segment in the whole length of the perimeter of the circle and the head, but technology of production of half-long segments is workable.

In another advantageous embodiment of the invention the incidence surface and the reflecting surface are convexly curved in the direction of the incidence of the flashlight whereas the curvature of the incidence surface corresponds to the curvature of the flashlight and the curvature of the reflecting surface is formed to reflect totally the light impinging on the reflecting surface into the circle, i.e. into the individual segments. The shape of both surfaces shall minimize the light losses during the incidence and reflection of the light.

In another advantageous embodiment of the invention the circular body has a lightproof part surrounding the system of "V" shaped teeth and the lateral sides of the circle. This arrangement further minimizes the light losses that could arise if the diffused light was emitted from the rear and lateral side of the circle.

In another advantageous embodiment the circular body has a transparent diffuser set opposite the emission surface. The transparent diffuser and the lightproof part also have a reinforcing function.

It is finally advantageous when the clamping device has a clamping chamber in the upper part of which there is a clamp with an upper pressure plate; a rotary clamp operating device is set on the upper pressure plate operating it through a thread. The clamping device allows an easy manipulation with the ring flash adapter when applied on the flash.

The ring flash adapter with a lightguide according to the invention is convenient for universal attachment on external flash of cameras and it is easy to handle. It can transmit higher light output because light is spread in one optical environment and there are no losses. The lightproof part of the circular body hinders inconvenient diffusion of light from the lightguide. Higher thermic energy is connected with higher light output which, however, is quickly conducted out from the flash and the clamping chamber into the individual segments of the lightguide. The light is evenly emitted in the whole width of the emission surface. The segment construction of the lightguide allows a significant decrease of weight and dimensions, the circular extension does not therefore charge the head of the flashlight.

BRIEF DESCRIPTION OF THE DRAWINGS

The invention shall be explained in more detail using drawings.

PREFERRED EMBODIMENTS OF THE INVENTION

It is understood that specific examples of realization of the invention, as described and depicted below, are provided only as an illustration and that they in no way limit realization of the invention to such examples. Experts proficient in the state of the art will find and will be able to identify through routine experimenting one or more equivalents of the realizations of the invention as specifically described herein. Such equivalents shall be covered by the scope of patent claims contained herein.

Figure 1:
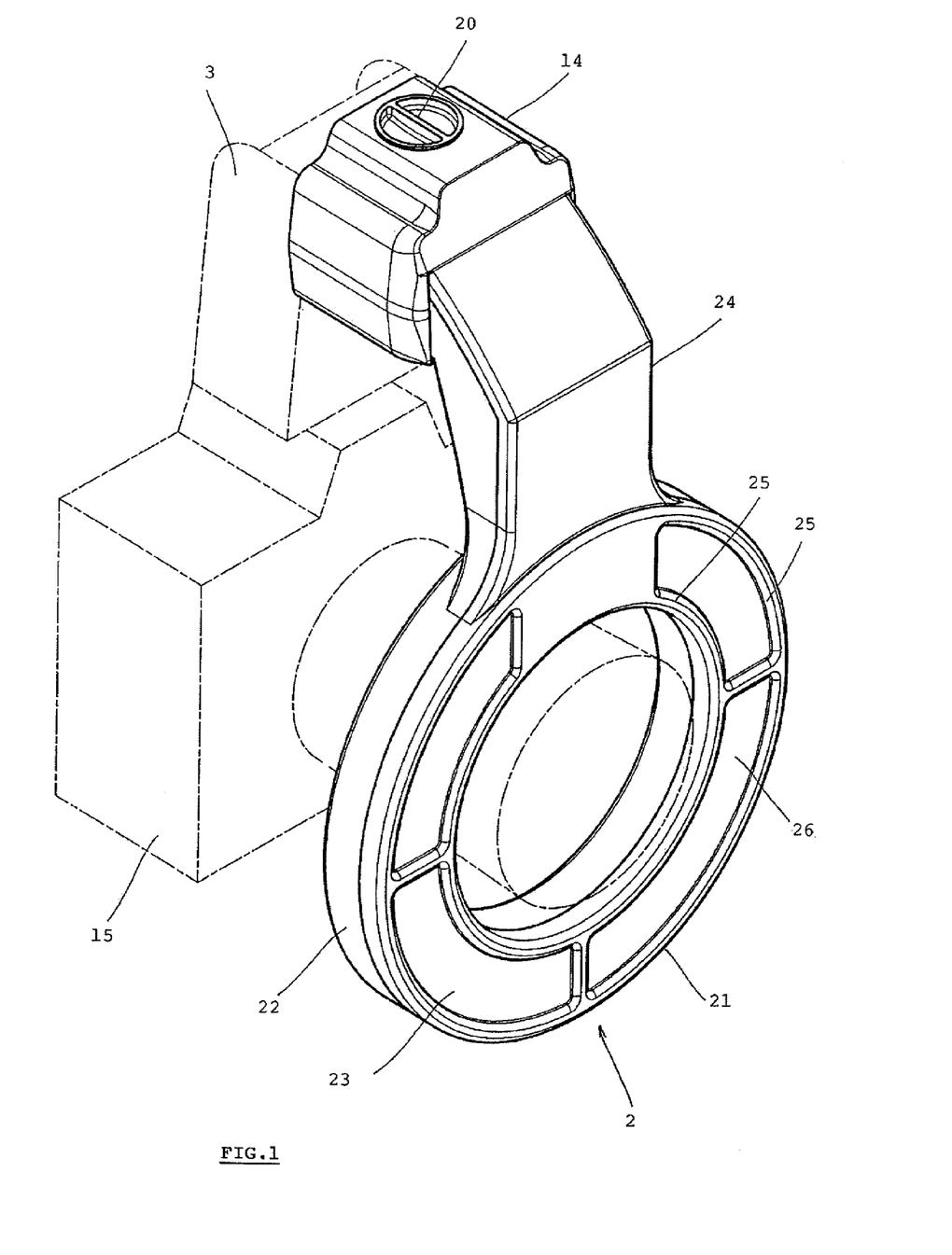
FIG. 1 is a perspective view of the ring flash adapter with a lightguide and a clamping device mounted on the flash of the camera.
Figure 2:
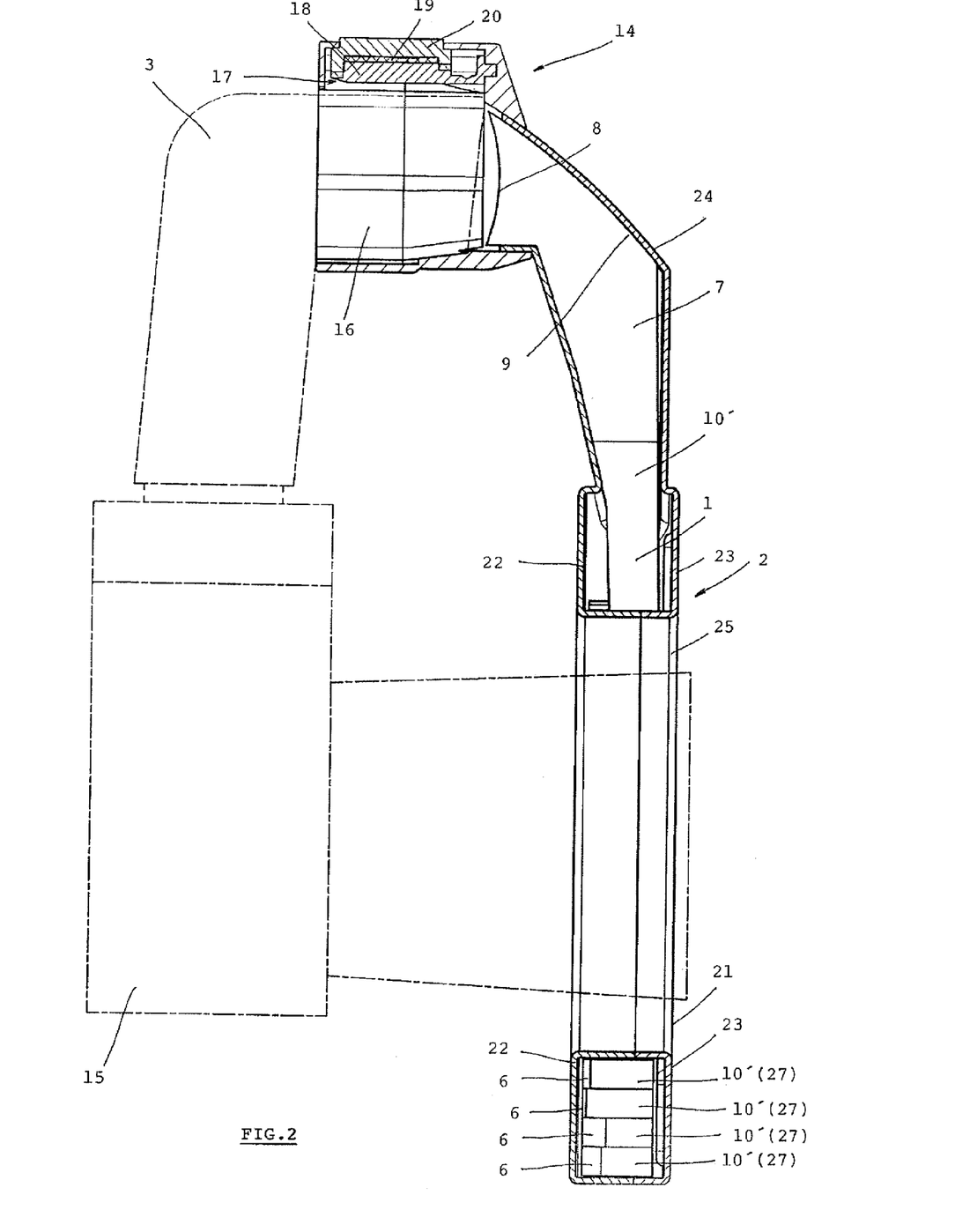
FIG. 2 is a vertical cross section view of the set showed in FIG. 1.
Figure 3:
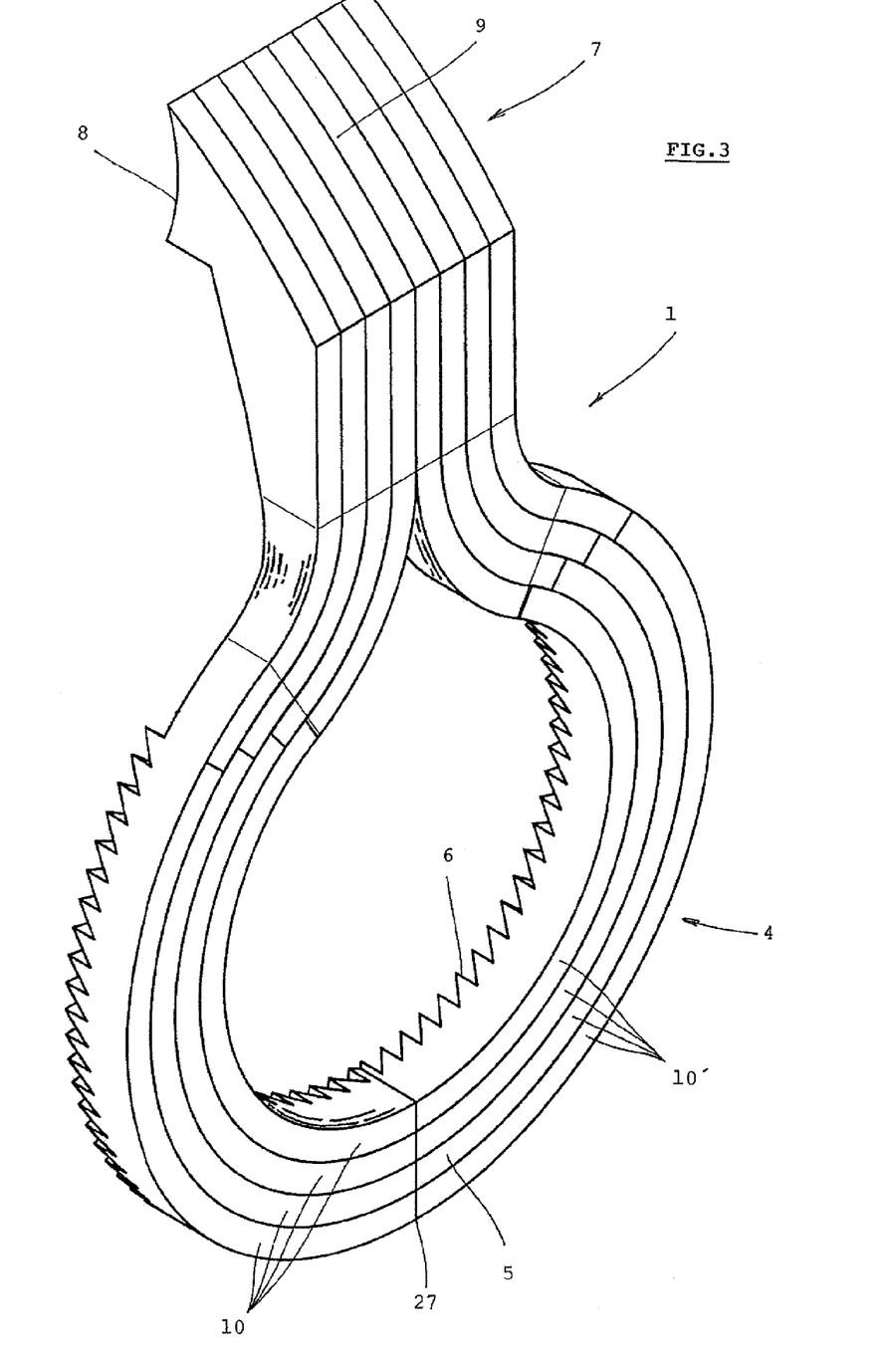
FIG. 3 is a perspective front view of the lightguide.
Figure 4:
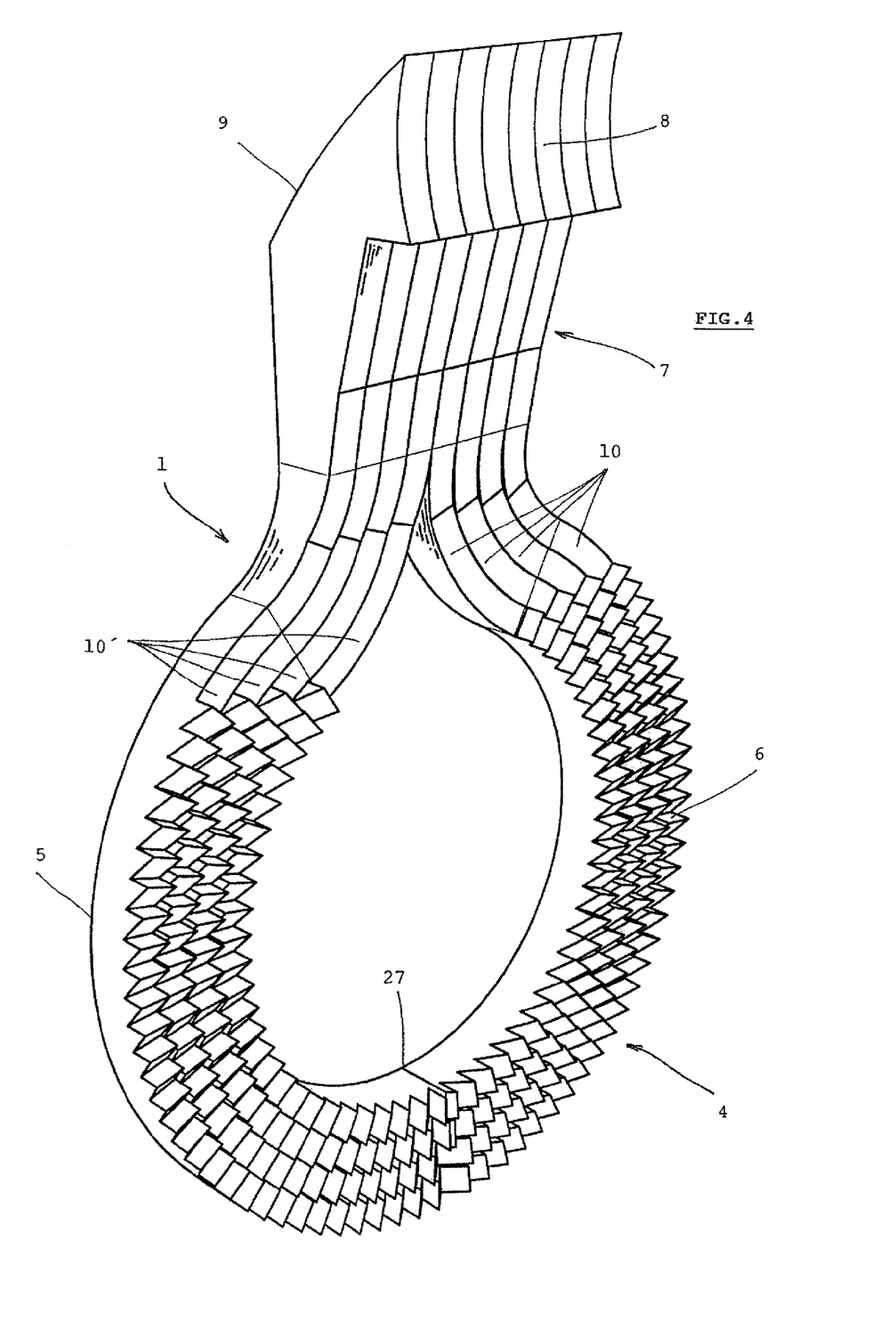
FIG. 4 is a perspective rear view of the lightguide.
Figure 5:
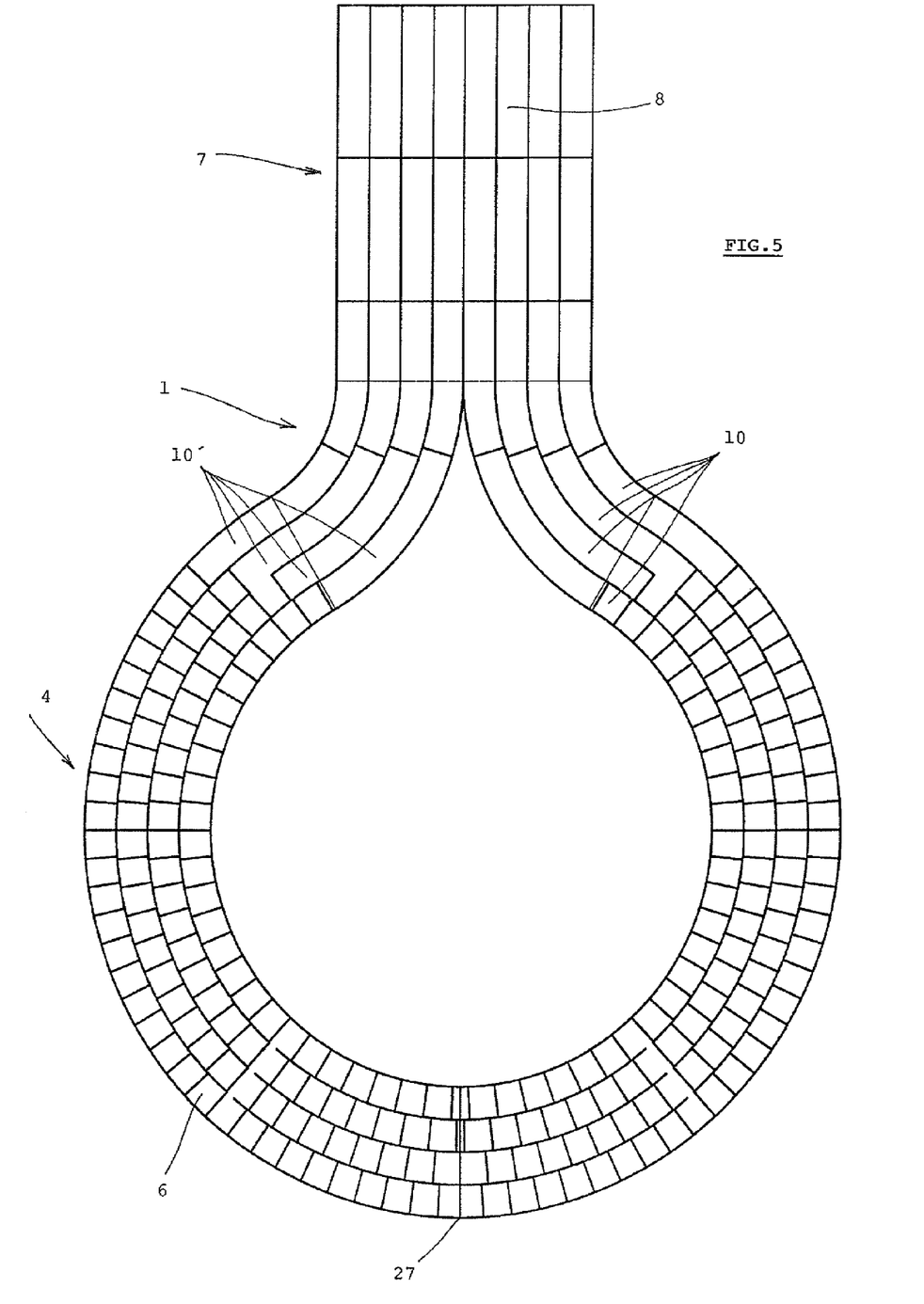
FIG. 5 is a rear view of the lightguide.
Figure 6:
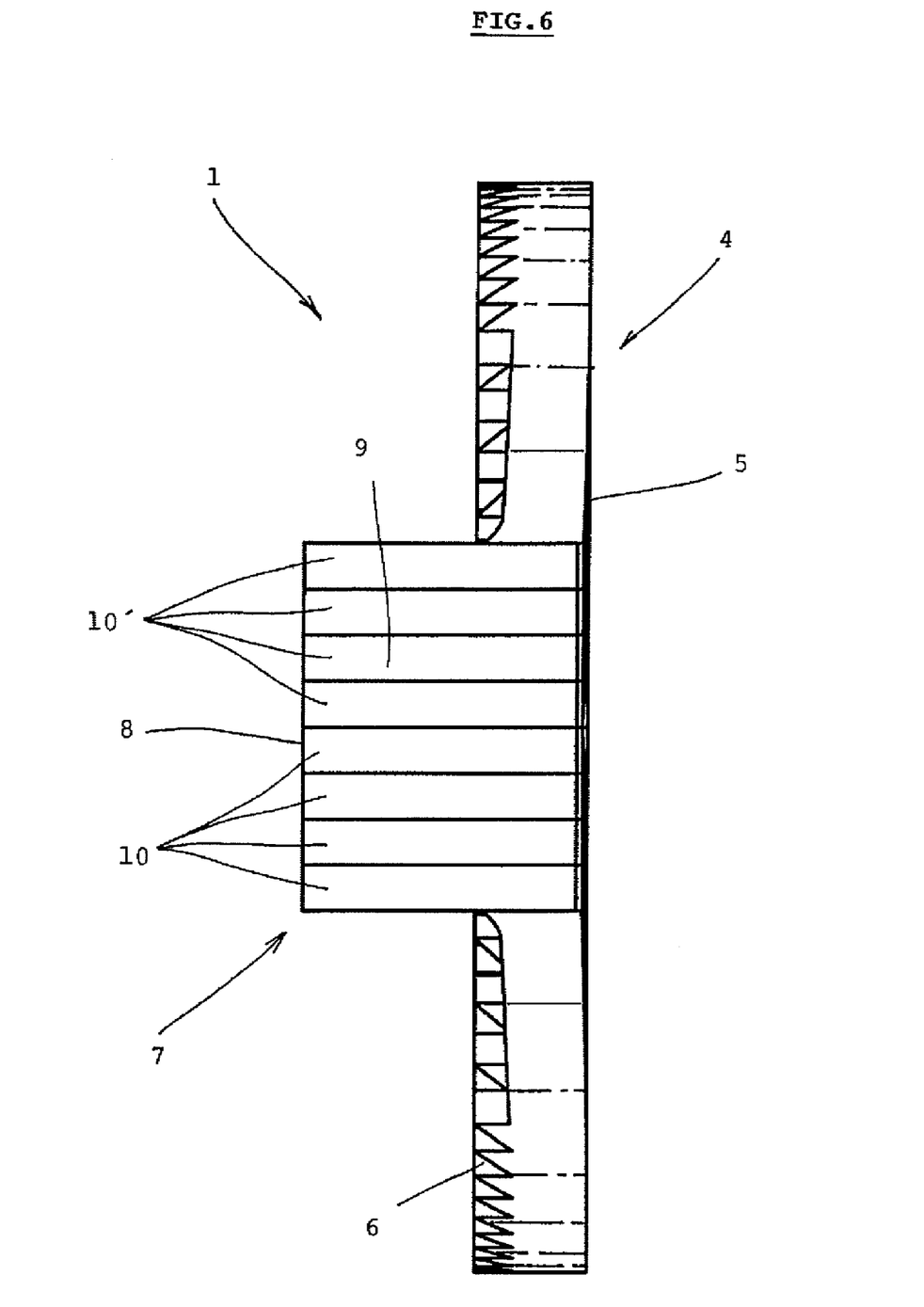
FIG. 6 is a top view of the lightguide.
Figure 7:
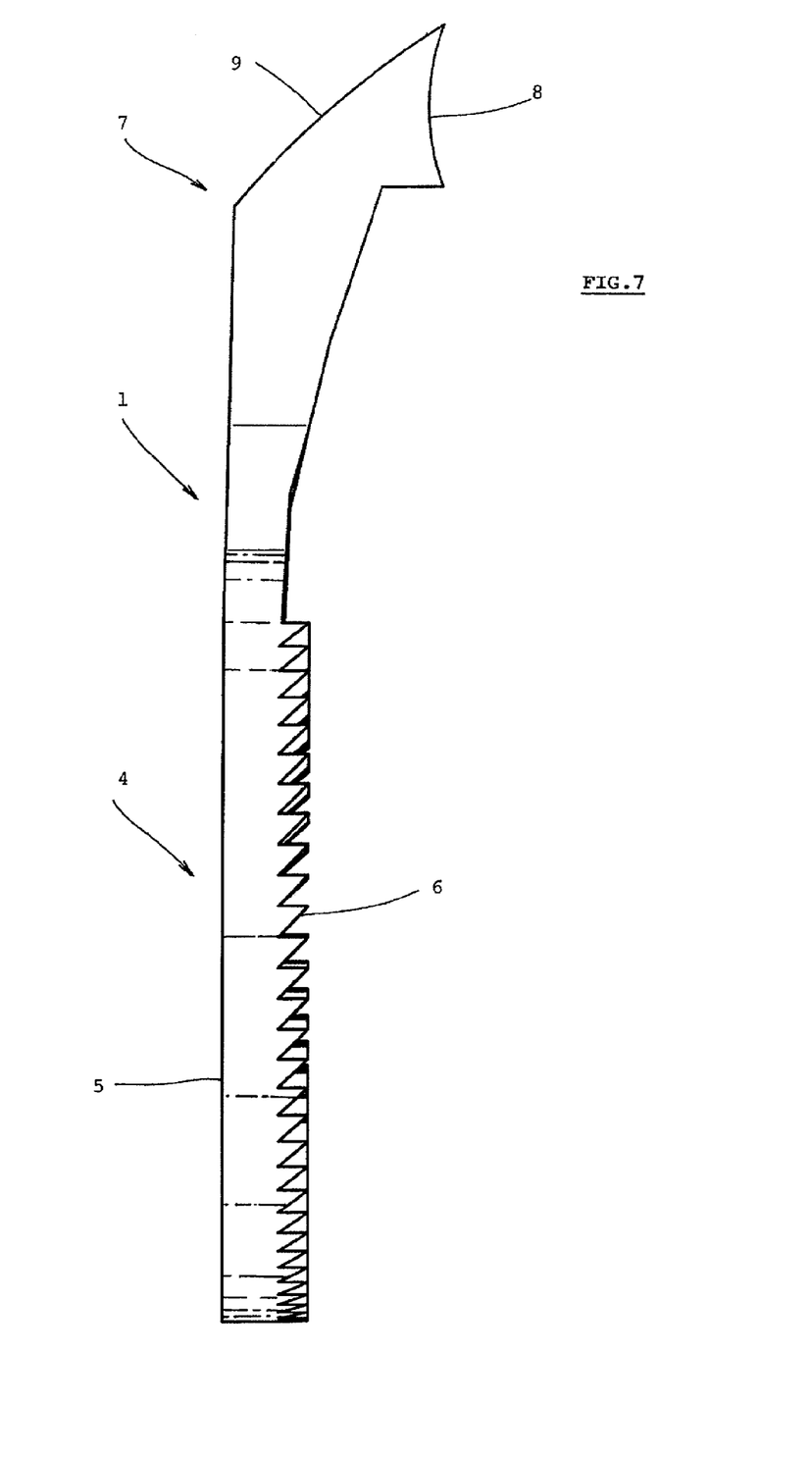
FIG. 7 is a lateral view of the lightguide.

As shown in FIG. 1 and FIG. 2 the ring flash adapter 2 is attachable to an external flash 3 of the camera 15 using a clamping device 14 especially due to its low weight (less than 500 g) and small dimensions (the outside perimeter of the ring flash adapter 2 is 146 mm). The ring flash adapter does not charge the single-flash head of the flash 3 and it can be attached directly to it.

The ring flash adapter 2 consists of a circular body 21 with an extension 24 which verges into the clamping device 14. The circular body 21 is made of a lightproof part that passes to the extension 24. The lightproof part 22 is made of a lightproof plastic on the basis of polysterene PSH. It has a protective function as it protects the rear side of the circle 4 of the lightguide 1 with the "V" shaped teeth 6 from damage. But it also has a cover function as it impedes emission of light from the rear and lateral surfaces of the lightguide 1.

On the perimeter of the lightproof part 22 a semi-groove is made in which a transparent diffuser 23 made of transparent polyethylene is stuck. The transparent diffuser 23 is set in front of the emission surface 5 and also passes into the extension 24. The transparent diffuser is not necessary to emit light from the emission surface 5 of the ring flash adapter 2 but it has a protective function and it is employed as a reinforcement of the whole ring flash extension 2 to prevent bending and twisting. The transparent diffuser 23 is provided with reinforcing perimeter frames 25 and offsets 26. In the extension 24 under the transparent diffuser a printed sheet can be put with business and design elements, eventually this part of the diffuser 23 can be provided with print.

The lightproof part 22, the transparent diffuser 23 and the extension 24 are shaped so that a lightguide from a lightconducting material can be inserted in them. The head 7 of the lightguide 1 is firmly deposited in the extension 24 and stuck in it. The circle 4 of the lightguide 1 is deposited in the circular body 21 with a mounting clearance so that distance, impermeable and dampening elements can be deposited in here.

A clamping device 14 made also of plastic is stuck to the extension 24. It has a clamping chamber 16 to insert and clamp the head 7 of the flash 3. In the upper part of the clamping chamber 16 the damper 17 is deposited in a sliding manner. The damper 17 is provided with an upper pressure plate 18 that sits on the head of the flashlight 3 set on the clamping chamber 16. The pressure plate is operated by a rotary clamp operating device 20 that works vertically via a thread 19. The clamping device 14 makes it possible to fasten the ring flash adapter 2 universally to different types and sizes of flashes 3.

The lightguide 1 deposited in the ring flash adapter 2 is made of polymetacrylate but it can also be made of polycarbon, polyamid and other appropriate light-conducting material. The lightguide 1 is formed from shaped semicircular belt segments 10, 10' showed in FIG. 8 and FIG. 9. The segments 10, 10' are produced by laser cutting or by injecting into the injection moulding machine. They are bent into the semicircular shape under the temperature 150° C. in shaping moulds. After cooling the lightguide 1 is composed from them in a folding jig; the individual segments 10, 10' are stuck or welded together in the upper part 13 i.e. in the head 7 and further on the lower ends 27 that come together in the lower part of the circle 4.

Figure 8:
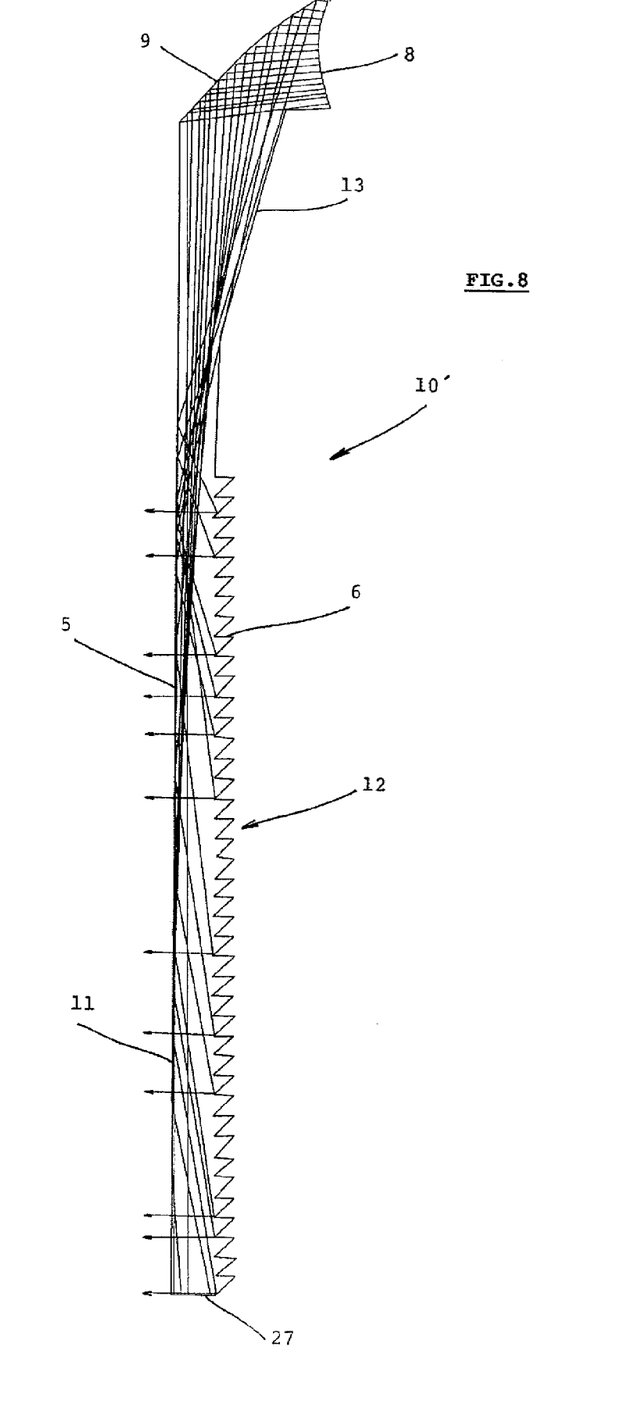
FIG. 8 is a cross section of a straight belt segment.
Figure 9:
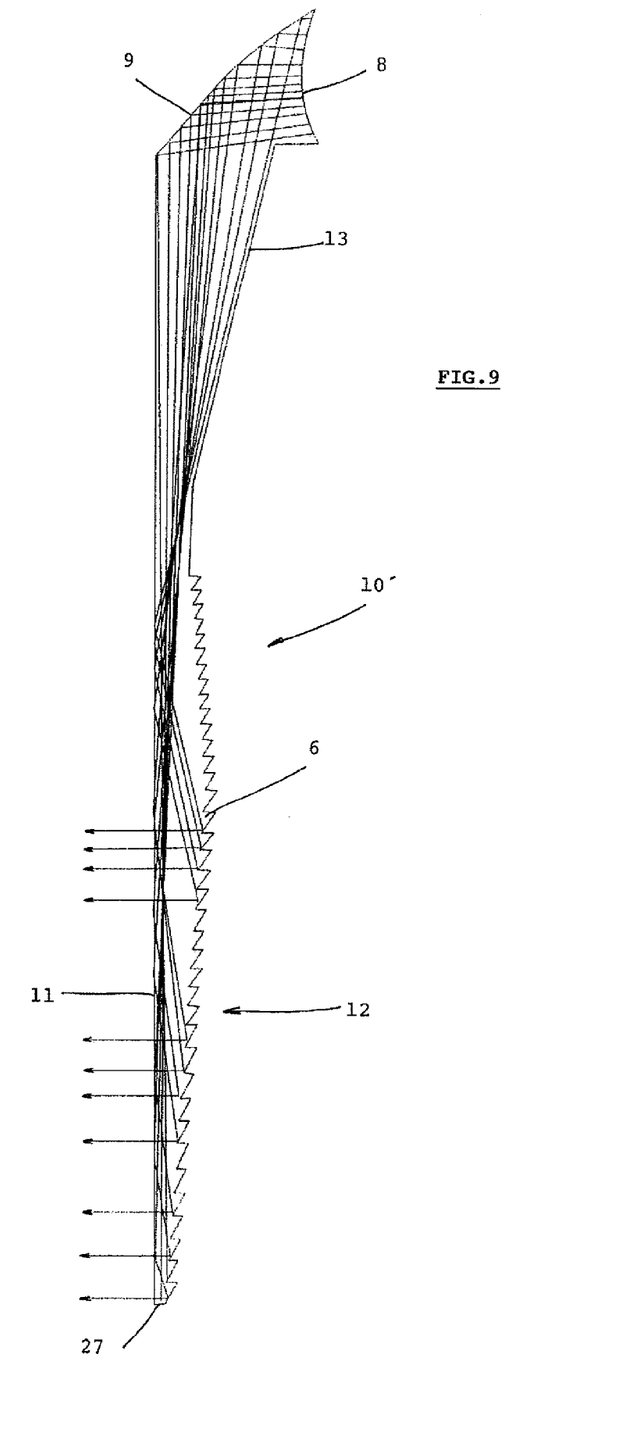
FIG. 9 is a cross section of a gibbous belt segment with marked reflection of the light beams.
Figure 10:
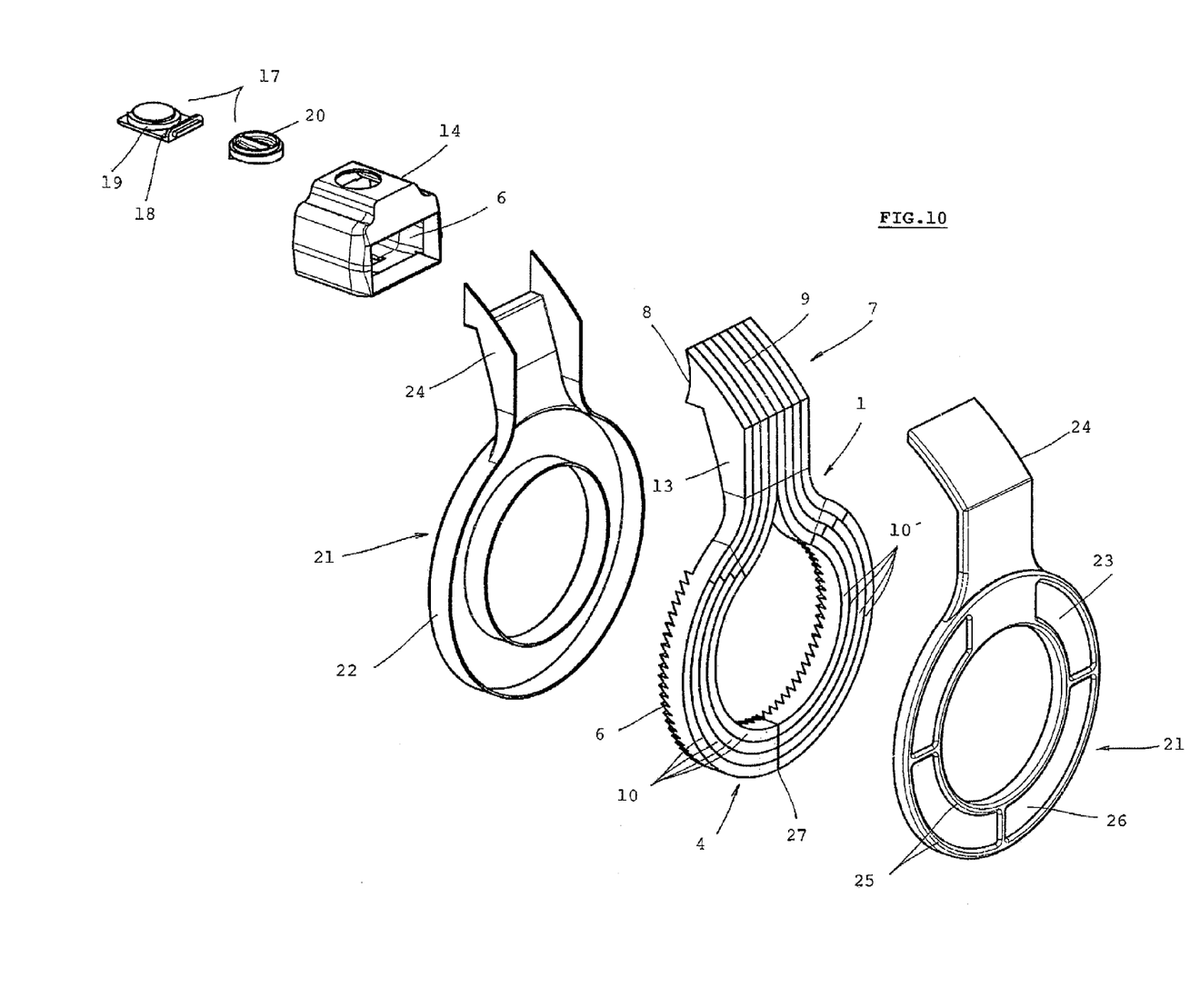
FIG. 10 is a view of the disintegrated set of the circular body, lightguide and the clamping device.

The foresides 11 of the segments 10, 10' are flat and after they are folded in the lightguide 1 their system forms the emission surface 5 of the circle 4. The rear sides 12 of the segments 10, 10' provided by ranges of "V" shaped teeth 6 forming a reflecting system from which the light is reflected to the emission surface 5 and out from the lightguide 1 and the ring flash light adapter 2. The rear side 12 can be flat as shown in FIG. 8 or it can be gibbous as shown in FIG. 9. The gibbous rear side 12 reflects the light more evenly in the whole length of the segments 10, 10' and it decreases the weight of the segments 10, 10' and thus the weight of the whole lightguide 1.

The upper parts 13 of the segments 10, 10' are shaped in such way as to form after folding and sticking or welding the head 7 with the incidence surface 8 and the reflecting surface 9. The incidence surface 8 is situated in the clamping chamber 16 of the clamping device 14 and the reflecting surface 9 is covered by the extension 24. The incidence surface 8 and the reflecting surface 9 is convexly curved in the direction of the flashlight incidence so that the light impinging on the reflecting surface 9 is totally reflected into the segments 10, 10'.

As shown in FIG. 8 and FIG. 9 the light beams from the flash 3 enter the head 7 of the lightguide 1 through the incidence surface 8; on the reflecting surface 9 it is reflected to the segments 10, 10' where they are made incident in an angular direction on their foresides 11. From here the light is reflected to the rear sides 12 of the segments 10, 10', where the system of "V" shaped teeth 6 reflects the beams perpendicularly back again to the foresides 11, where from the beams are emitted from the lightguide 1 through the emission surface 5 and through the transparent diffuser 23 further out from the ring flash adapter 2.

OVERVIEW OF USED DESIGNATIONS IN THE DRAWINGS

1 Lightguide
2 Ring flash adapter
3 Flashlight
4 Circle
5 Emission surface
6 "V" shaped tooth
7 Head
8 Incidence surface
9 Reflecting surface
10 Shaped belt segment
10' Shaped belt segment
11 Front side of the segment
12 Rear side of the segment
13 Upper part of the segment
14 Clamping device
15 Camera
16 Clamping chamber
17 Clamp
18 Upper pressure plate
19 Thread
20 Rotary clamp operating device
21 Circular body
22 Lightproof part of the circular body
23 Transparent diffuser
24 Extension
25 Perimeter frame
26 Offset
27 Lower end of the segment

What I claim is:

1. A ring flash adapter comprising:
   a clamping device to attach to an external flash of a camera;
   a circular body with a transparent part and lightproof part, connected by the clamping device; and
   a lightguide extending from the clamping device and housed in the circular body;
   wherein the said lightguide has a head and a circle, the head comprising:
      an incidence surface which the light from the external flash impinges on, and
      a reflecting surface slanted with respect to the incidence surface for reflecting the light further into the lightguide; and
   wherein the circle comprises a first semicircle and a second semicircle and wherein the first semicircle comprises a plurality of separate, parallel, inter-connected shaped belt segments and the second semicircles comprises a corresponding number of separate, parallel, inter-connected shaped belt segments as the first semicircle, and wherein, at the top of said circle, the first and second semi-circles contact and extend radially and jointly out from the circle into the head,
   one side of the circle is formed by an emission surface, the other side of the circle is provided with a system of adjacent "V" shaped teeth to reflect the light onto the emission surface,
   the foresides of the segments are flat and their system forms the emission surface of the circle, the rear sides of the segments are provided with "V" shaped teeth, and they form the system of "V" shaped teeth on the rear side of the circle, the upper parts of the segments are shaped and inter-connected to form the head, whereby the light reflected from the reflecting surface is conducted through the individual segments into the two semicircles evenly, the light is conducted evenly on the whole perimeter of the circle, and is diffused evenly from the whole emission surface, wherein the length of each segment corresponds to the length of the head and the half of the perimeter of the circle in the layer appropriate to the given segment, and wherein the lower ends of the respective segments are inter-connected in one layer.

2. The ring flash adapter according to claim 1, wherein the incidence surface and the reflecting surface are curved and the curvature of the incidence surface corresponds to the curvature of the external flashlight and the curvature of the reflecting surface is formed to reflect the light impinging on the reflecting surface into the circle.

3. The ring flash adapter according to claim 1, wherein the circular body has a lightproof part surrounding the system of "V" shaped teeth and the lateral sides of the circle.

4. The ring flash adapter according to claim 1, wherein the clamping device has a clamping chamber in the upper part of which there is a clamp with an upper pressure plate and a rotary clamp operating device operates the upper pressure plate by the thread.

* * * * *